(12) United States Patent
Martin et al.

(10) Patent No.: US 11,569,906 B2
(45) Date of Patent: *Jan. 31, 2023

(54) COMMUNICATIONS DEVICE, INFRASTRUCTURE EQUIPMENT AND METHOD

(71) Applicant: SONY CORPORATION, Tokyo (JP)

(72) Inventors: Brian Alexander Martin, Basingstoke (GB); Yuxin Wei, Basingstoke (GB); Hideji Wakabayashi, Basingstoke (GB); Shinichiro Tsuda, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 17/113,358

(22) Filed: Dec. 7, 2020

(65) Prior Publication Data

US 2021/0091850 A1    Mar. 25, 2021

Related U.S. Application Data

(63) Continuation of application No. 16/090,217, filed as application No. PCT/EP2017/055871 on Mar. 13, 2017, now Pat. No. 10,862,580.

(30) Foreign Application Priority Data

Apr. 1, 2016   (EP) .................................... 16163490

(51) Int. Cl.
*H04W 4/00*   (2018.01)
*H04B 7/26*   (2006.01)
(Continued)

(52) U.S. Cl.
CPC ........... *H04B 7/2606* (2013.01); *H04L 69/14* (2013.01); *H04W 4/80* (2018.02); *H04W 28/22* (2013.01);
(Continued)

(58) Field of Classification Search
None
See application file for complete search history.

(56) References Cited

U.S. PATENT DOCUMENTS

2002/0187746 A1   12/2002   Cheng et al.
2012/0282961 A1   11/2012   Bienas et al.
(Continued)

FOREIGN PATENT DOCUMENTS

WO   2015/026200 A1   2/2015
WO   2015/141165 A1   9/2015

OTHER PUBLICATIONS

China Telecom, "Discussion on UE Relay for eMBB and IoT," RP-160247, 3GPP TSG RAN Meeting #71, Göteborg, Sweden, Mar. 7-10, 2016, pp. 1-7.

(Continued)

*Primary Examiner* — Bob A Phunkulh
(74) *Attorney, Agent, or Firm* — Xsensus LLP (57) ABSTRACT

A communication device is configured to communicate with an infrastructure equipment forming part of a mobile communications network, and to communicate with one or more relay nodes of the mobile communications network. The communications device comprises a receiver configured to receive signals on the downlink from the one or more relay nodes via a first wireless interface, and to receive signals on the downlink from the infrastructure equipment via second wireless access interface, a transmitter configured to transmit signals on the uplink to the one or more relay nodes via the first wireless access interface, and to transmit signals on (Continued)

the uplink to the infrastructure equipment via the second wireless access interface, and a controller configured to control the receiver to receive the signals and to control the transmitter to transmit the signals.

17 Claims, 5 Drawing Sheets (51) Int. Cl.
*H04W 88/04* (2009.01)
*H04L 69/14* (2022.01)
*H04W 88/06* (2009.01)
*H04W 4/80* (2018.01)
*H04W 36/00* (2009.01)
*H04W 28/22* (2009.01)
*H04W 40/22* (2009.01)

(52) U.S. Cl.
CPC ........... *H04W 36/03* (2018.08); *H04W 40/22* (2013.01); *H04W 88/04* (2013.01); *H04W 88/06* (2013.01)

(56) References Cited

U.S. PATENT DOCUMENTS

| | | |
|---|---|---|
| 2014/0328310 A1 | 11/2014 | Xu |
| 2014/0344361 A1* | 11/2014 | Dunne ................. G06Q 10/10 709/204 |
| 2016/0156404 A1 | 6/2016 | Wolfner et al. |
| 2016/0191375 A1 | 6/2016 | Gopala Krishnan et al. |
| 2016/0212682 A1 | 7/2016 | Chung et al. |
| 2016/0269568 A1 | 9/2016 | Dandra et al. |
| 2017/0273055 A1 | 9/2017 | Xu et al. |
| 2017/0359766 A1 | 12/2017 | Agiwal et al. |
| 2018/0124674 A1* | 5/2018 | Vutukuri ............... H04W 40/22 |
| 2018/0213577 A1 | 7/2018 | Burbidge et al. |
| 2018/0254948 A1 | 9/2018 | Li et al. |
| 2018/0255611 A1 | 9/2018 | Li et al. |
| 2019/0327653 A1* | 10/2019 | Jin .................... H04W 36/0016 |

OTHER PUBLICATIONS

Holma, H. and Toskala, A., "LTE for UMTS: OFDMA and SC-FDMA Based Radio Access," First published: Mar. 31, 2009, Copyright © 2009 John Wiley & Sons, Ltd,Print ISBN:9780470994016, pp. 25-27.

Huawei, Hisilicon, "L2 UE-to-Network Relay for E-UTRAN," RP-160415, 3GPP TSG-RAN #71, Göteborg, Sweden, Mar. 7-10, 2016, pp. 1-4.

Intel, "Motivation for SI: Further LTE D2D Enhancements for Wearables and MTC," RP-160427, 3GPP TSG RAN Meeting #71, Göteborg, Sweden, Mar. 7-10, 2016, pp. 1-14.

Qualcomm Incorporated, "Motivation for SI proposal on Further Enhancements to LTE Device to Device," RP-160268, Agenda: 10.1.2, © 2013-2014 Qualcomm Technologies, Inc. and/or its affiliated companies, pp. 1-10.

Qualcomm Incorporated, "New Work Item: NarrowBand Iot (NB-IOT)," RP-151621, 3GPP TSG RAN Meeting #69, Phoenix, USA, Sep. 14-16, 2015, pp. 1-9.

Qualcomm Incorporated, Intel, Huawei, Hisilicon, LG Electronics Inc., "New SI: Further Enhancements LTE Device to Device, UE to Network Relays for Wearables," RP-160677, 3GPP TSG RAN Meeting #71, Gothenburg, Sweden, Mar. 7-10, 2016.

ZTE, "Motivation for new Work Item on D2D communication for commercial use cases," RP-160283, 3GPP TSG RAN Meeting #71, Goteborg, Sweden, Mar. 7-10, 2016, pp. 1-8.

International Search Report and Written Opinion for International Application No. PCT/EP2017/055871 dated May 26, 2017.

* cited by examiner

COMMUNICATIONS DEVICE, INFRASTRUCTURE EQUIPMENT AND METHOD

CROSS-REFERENCE TO RELATED APPLICATIONS

The present application is a continuation of U.S. Ser. No. 16/090,217 filed on Sep. 29, 2018 which is based on PCT filing PCT/EP2017/055871, filed Mar. 13, 2017, which claims priority to EP 16163490.2 filed Apr. 1, 2016, the entire contents of each are incorporated herein by reference.

BACKGROUND

Field of Disclosure

The present disclosure relates to a communications device which is configured to receive signals from an infrastructure equipment in a mobile communications network where relay nodes may be used, and a method for the same.

The present disclosure claims the Paris convention priority of European patent application 16163490.2 the contents of which are herein incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to example embodiments of the present technique, a communications device is configured to communicate with an infrastructure equipment forming part of a mobile communications network, and to communicate with one or more relay nodes of the mobile communications network. The communications device comprises a receiver configured to receive signals on the downlink from the one or more relay nodes via a first wireless interface, and to receive signals on the downlink from the infrastructure equipment via a second wireless access interface, a transmitter configured to transmit signals on the uplink to the one or more relay nodes via the first wireless access interface, and to transmit signals on the uplink to the infrastructure equipment via the second wireless access interface, and a controller configured to control the receiver to receive the signals and to control the transmitter to transmit the signals. The controller is configured in combination with the receiver and the transmitter in a first mode of operation to perform one or more of transmitting signals representing data via the first wireless access interface to one of the relay nodes for transmission via the second wireless access interface to the infrastructure equipment, and receiving signals representing data via the second wireless access interface from the infrastructure equipment via the first wireless access interface from the one of the relay nodes. In response to predetermined conditions, the controller is configured in combination with the receiver and the transmitter to switch to a second mode of operation, in the second mode of operation performing one or more of transmitting signals representing data via the second wireless access interface to the infrastructure equipment, and receiving signals representing data via the second wireless access interface from the infrastructure equipment. In embodiments of the present disclosure, the predetermined conditions may comprise the reception of a fallback indication, the fallback indication indicating to the communications device should switch to the second mode of operation. In embodiments of the present disclosure, the communications device may be configured to receive from the infrastructure equipment via the one of the relay nodes a paging message, the paging message including the fallback indication, and to transmit to the infrastructure equipment a paging response message, the paging response message indicating that the communications device has received the paging message including the fallback indication.

Embodiments of the present technique can provide arrangements in which a communications device is able to save power by communicating across a low power link to a relay device in close proximity to the communications device when in a mode which requires little or no communication with the network, but allows for the quick setup of a call with the cellular network when necessary.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System and Relay Nodes

Figure 1:
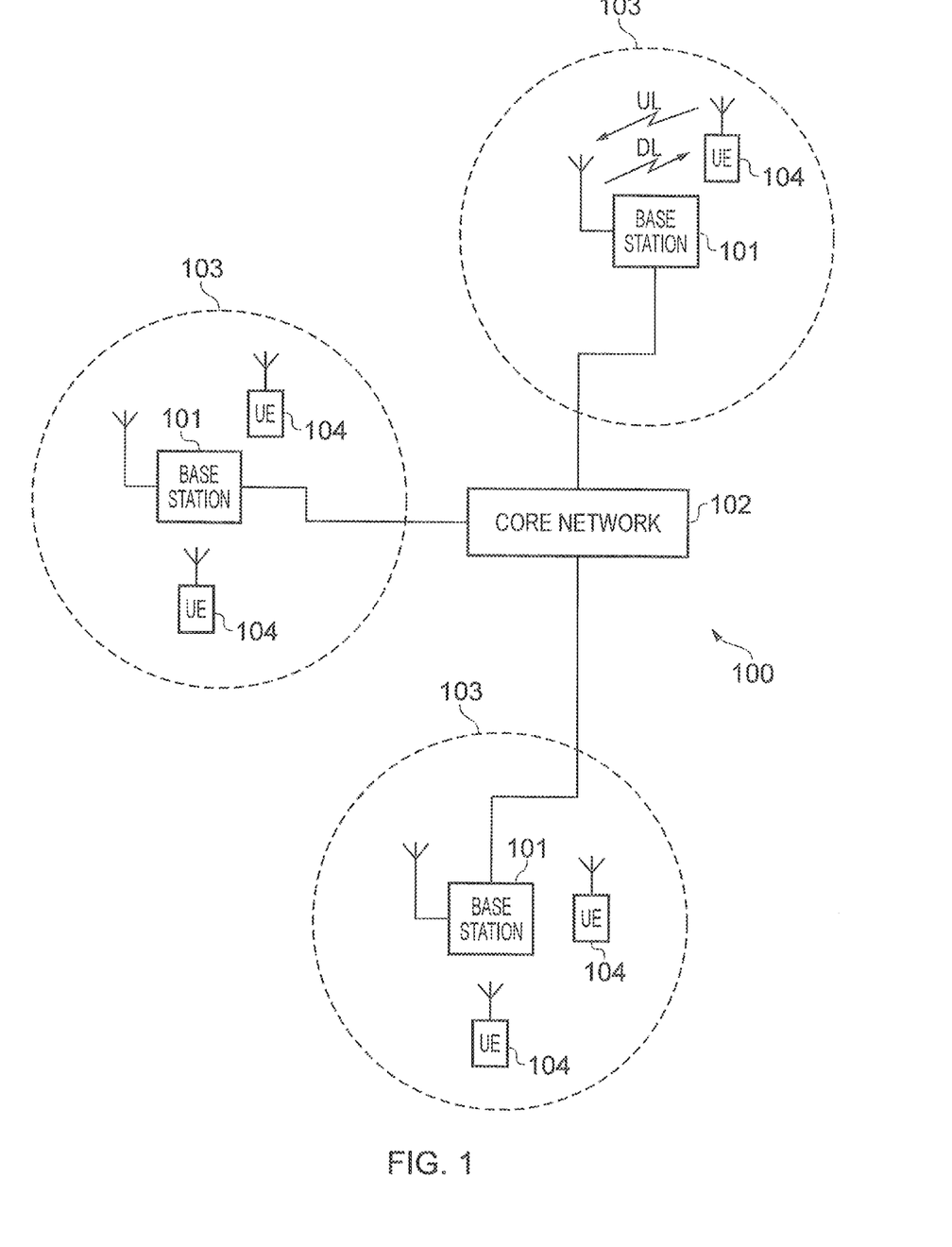
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many hooks on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced.

Figure 2:
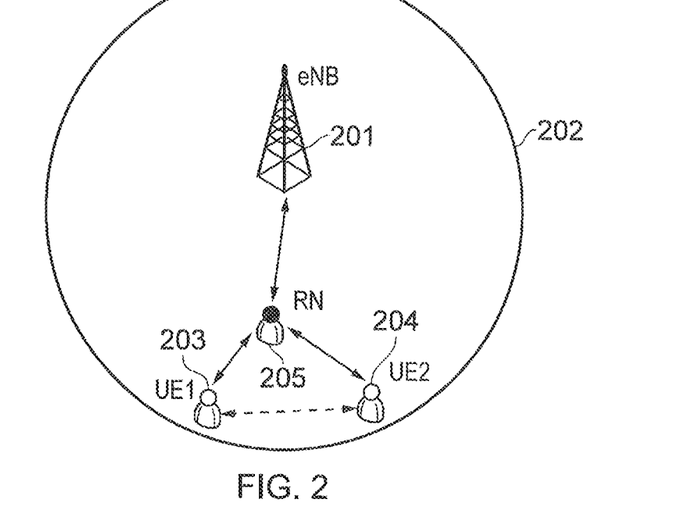
FIG. 2 illustrates an example of D2D communications using a relay node.

FIG. 2 illustrates an example network comprising an eNodeB 201 with a coverage area 202. Two UEs 203 and 204 may communicate with one another using device-to-device (D2D) communications. To communicate with the eNodeB 201, each of the UEs 203 and 204 communicate with a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

In other examples, the backhaul link may also be provided over a wired connection. Relay technologies are known generally to provide an arrangement for receiving signals from a base station and for retransmitting the received signals to a UE in a mobile communications network, or to receive signals transmitted from a UE for re-transmission to a base station of a mobile communications network.

A UE may be in an idle mode, in which it is not visible to its serving eNodeB. The UE may enter this mode in order to conserve power, if it determines that it is not receiving or transmitting messages at a high enough rate for it to justifiably remain in a connected mode. When in the idle mode, the UE may receive paging messages from its serving eNodeB in order to request the establishment of a non access stratum (NAS) signalling connection to the UE. The eNodeB transmits this paging message such that it may be received by the UE (still in idle mode) at any point inside the coverage region, or serving cell, of the eNodeB. The reception of the paging message by the UE culminates in it leaving the idle mode and re-entering the connected mode, in which it is ready to receive or transmit signals representing data. However, should the UE move out of coverage of the eNodeB, whilst the UE is in idle mode, then there is no way for the eNodeB to know this. Should the eNodeB wish to communicate with the UE, it will not be able to reach it with the paging messages, and the UE will never be aware that the eNodeB is attempting communication. As proposed in co-pending European patent application EP15169053.4, a UE which detects it is moving out of coverage, or may at a later time move out of coverage of its serving eNodeB, may establish a connection with a relay UE such that it is able to receive via the relay UE a paging message from the eNodeB.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:
1. 'Stand-alone operation' utilising for example the spectrum currently being used by GERAN systems as a replacement of one or more GSM carriers
2. 'Guard band operation' utilising the unused resource blocks within a LTE carrier's guard-band
3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Wearable devices (such as smartwatches and the like) are examples of devices which may make use of NB-IoT or LC-MTC communications systems. In 3GPP Rel. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes for Wearable Devices

One of the benefits of connecting indirectly to the network via a relay is that a remote device (e.g. a wearable device such as a smart watch) may reduce its power consumption, since uplink transmissions can be performed at a much shorter range to the relay device, rather than to the eNodeB. One potential realisation of this would be to utilise a narrowband channel similar to eMTC or NB-IoT for the relay link. This would be suitable for sending (and also potentially receiving) small amounts of data via the relay.

Figure 3:
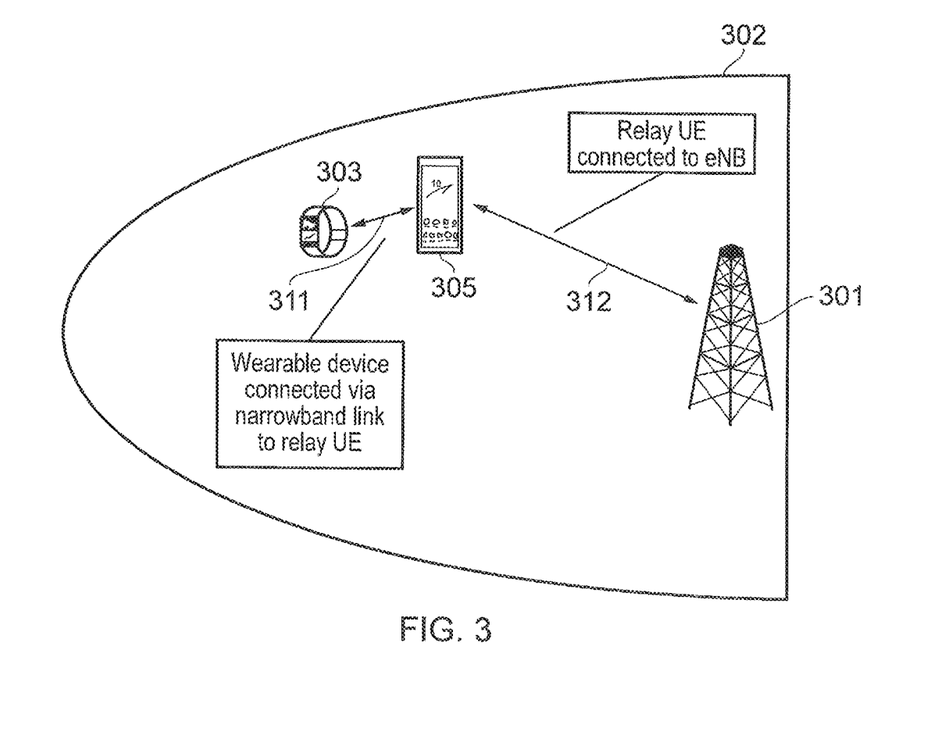
FIG. 3 illustrates an example scenario in which a remote wearable device may communicate with an eNodeB using a communications device as a relay node.

FIG. 3 illustrates an example scenario in which a remote wearable device 303 may communicate with an eNodeB 301 using a communications device 305 as a relay node. The eNodeB 301 has a coverage area 302, which the remote wearable device 303 and communications device 305 are within. The remote wearable device 303 is connected by a narrowband link 311 to the communications device 305, and the communications device is connected by a conventional link 312 to the eNodeB 301. The remote wearable device 303 may be, for example, a smartwatch, while the communications device 305 may be, for example a smartphone. The owner of the smartwatch may also own the smartphone, or alternatively, they may be owned by separate users.

However, this type of low complexity/narrowband channel 311 is unlikely to be suitable for a service that requires a higher quality of service, for example a voice (VoLTE) call. This would be particularly true if D2D enhancements provide a less reliable or less efficient link compared to a direct link to the eNB—for example, if not all proposed enhancements are standardised in Rel.14 and a rather simple D2D link is standardised.

Paging via Relay with Cellular Fallback Indication

Figure 4:
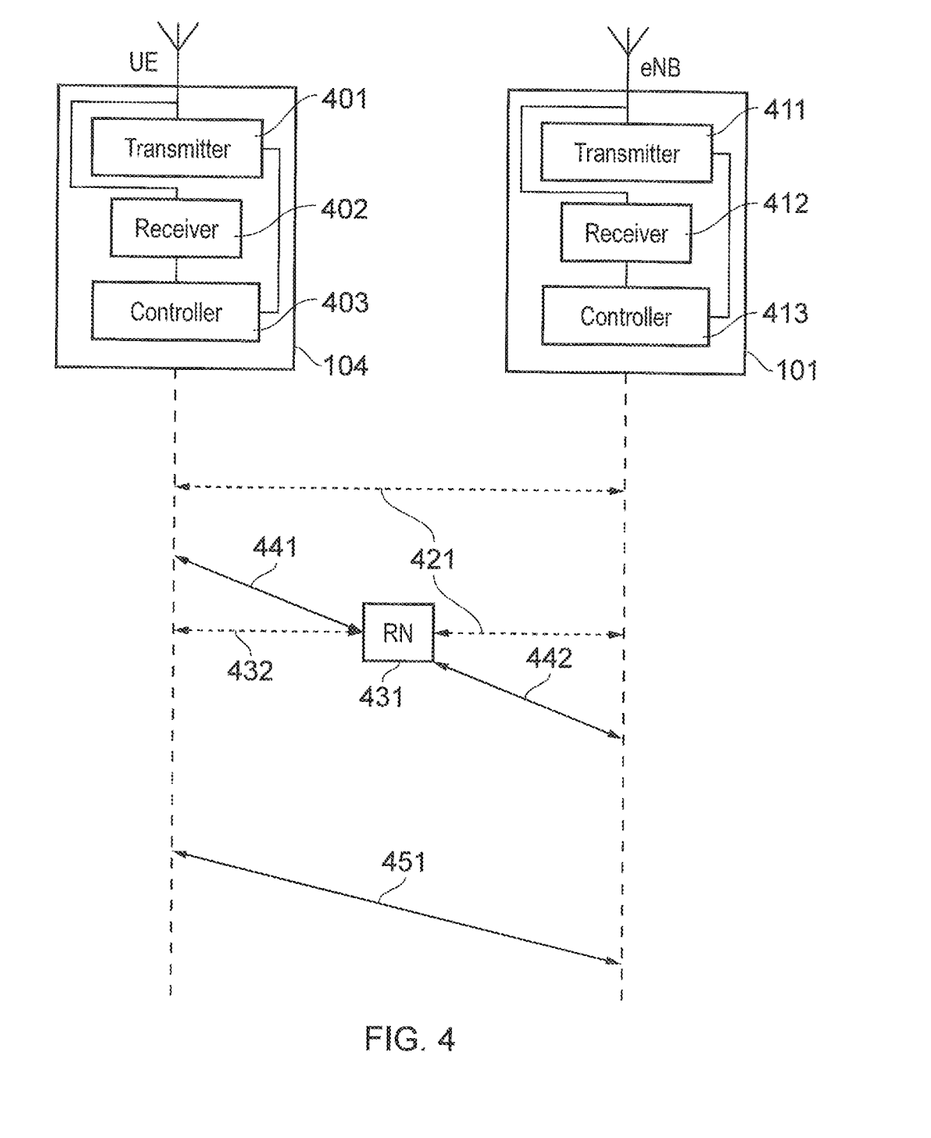
FIG. 4 is a part schematic representation, part message flow diagram of communications between a UE, an eNodeB and a relay node in accordance with embodiments of the present disclosure.

Embodiments of the present technique can provide an arrangement in which a mobile communications device or UE 104 can operate to communicate in a wireless communications system via a base station or infrastructure equipment. FIG. 4 is a part schematic block diagram of a communications device 104 and an infrastructure equipment 101, and part message flow diagram illustrating a process of communications between the communications device 104, the infrastructure equipment 101 and a relay node 431 in accordance with embodiments of the present disclosure. Each of the infrastructure equipment 101 and communications device 104 comprise a transmitter 401, 411, a receiver 402, 412 and a controller 403, 413 to control the transmitter 401, 411 and receiver 402, 412.

The communications device 104 is configured in a first mode of operation to perform one or more of transmitting signals 441 representing data via a first wireless access interface 432 to the relay node 431 for transmission 442 via a second wireless access interface 421 to the infrastructure equipment 101, and receiving signals 442 representing data via the second wireless access interface 432 from the infrastructure equipment 101 via 441 the first wireless access interface 421 from the relay node 431. For example, the communications device 104 may be actively communicating with the infrastructure equipment 101 via the relay node 431 and so will be both transmitting and receiving signals. Alternatively the communications device 104 may be inactive, and waiting to receive paging messages from the infrastructure equipment 101 via the relay node 431. In response to predetermined conditions, the communications device 104 is configured to switch to a second mode of operation, in the second mode of operation performing one or more of transmitting 451 signals representing data via the second wireless access interface 421 to the infrastructure equipment 101, and receiving 451 signals representing data via the second wireless access interface 421 from the infrastructure equipment 101. In embodiments of the present disclosure, the predetermined conditions may comprise the reception of a fallback indication, the fallback indication indicating to the communications device 104 should switch to the second mode of operation. In embodiments of the present disclosure, the communications device 104 may be configured to receive from the infrastructure equipment 101 via the relay node 431 a paging message, the paging message including the fallback indication, and to transmit to the infrastructure equipment 101 a paging response message, the paging response message indicating that the communications device 104 has received the paging message including the fallback indication.

The predetermined conditions may comprise an initiation of a service which has a Quality of Service (QoS) requirement of greater than a predetermined threshold, such as the initiation of a voice call via the infrastructure equipment 101. The predetermined conditions may alternatively comprise an initiation of a service with a throughput of received or transmitted signals representing data being higher than a predetermined threshold, an initiation of a service with a latency of received or transmitted signals representing data being lower than a predetermined threshold, or an initiation of a service with a reliability requirement of received or transmitted signals representing data being higher than a predetermined threshold. Upon the ending of any of these services of which the initiation causes the communications device 104 to switch from the first mode of operation to the second mode of operation, the communications device 104 is configured to switch back to the first mode of operation. The predetermined conditions may also comprise the reception of an indication by the communications device 104 that system information has been updated on the second wireless access interface 432, wherein upon completion of acquisition of the updated system information on the second wireless access interface 432, the communications device 104 is configured to switch to the first mode of operation.

The first wireless access interface 421 may have a relative capability lower than a relative capability of the second wireless access interface 432.

In a scenario in which a remote device is connected indirectly to the network via a relay device, the network is aware of the remote device's presence (e.g. it may have a registered Universal Subscriber Identity Module (USIM)). It may be the case that the remote device and relay device each have a unique Universal Integrated Circuit Card (UICC) or SIM identity. When initiating a call, the network determines that the device is connected using a non-optimal physical channel link (e.g. low power/complexity D2D link) and includes an indication in the paging message which is to be forwarded by the relay device, that the remote device should immediately establish a direct connection with the eNodeB.

The indication may cause the remote UE to perform a random access procedure similar to RRC connection establishment (and so would use contention based random access). Alternatively, the paging message may include a dedicated preamble (similar to handover) so that the remote device can perform contention free random access. Physical channel configurations may additionally be optionally provided via the relay device.

The fallback indication could be implicit—e.g. if a voice call is initiated, or if quality of service requested is too high for UE to support on the relay link, the UE automatically knows that it shall respond with a direct connection to the eNB. However, an explicit indication could be beneficial in the case that the relay may be able to provide the necessary quality of service, but the network preference is to provide the service directly.

Figure 5:
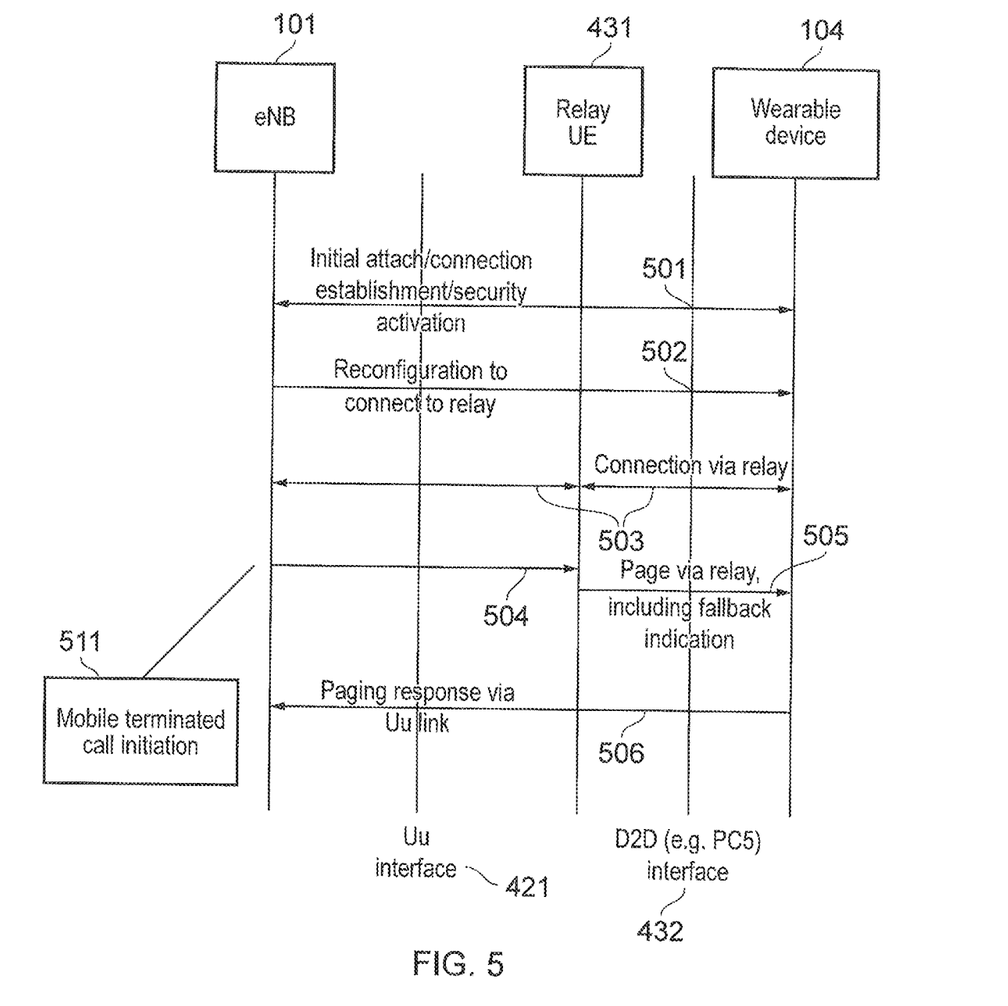
FIG. 5 illustrates an example of paging via a relay device with fallback indication in accordance with embodiments of the present disclosure.

FIG. 5 illustrates an example of paging between an eNodeB 101 and a wearable device 104 via a relay device 431 with fallback indication in accordance with embodiments of the present disclosure. The eNodeB 101 and wearable device 104 have first undergone an initial attachment, connection establishment or security activation 501, the eNodeB 101, the eNodeB 101 and wearable device 104 having communicated over the Uu wireless access interface 421. At a point later in time, the eNodeB 101 reconfigures and instructs 502 the wearable device 104 to connect to the relay device 431, where the wearable device 104 and the relay device 431 communicate over a D2D wireless access interface such as the PC5 interface 432, which is a direct interface between two devices supporting Proximity Services (ProSe). Following the reconfiguration 502, there is now a connection 503 via the relay device 431 between the eNodeB 101 and the wearable device 104, wherein the wearable device 104 may communicate with the relay device 431 over the PC5 interface 432, and the eNodeB 101 may communicate with the relay device 431 over the Uu interface 421. At a point later in time, the eNodeB 101 may receive a mobile terminated call initiation 511 from another communications device, and explicitly or implicitly determine that the PC5 interface 432 is unsuitable for communications between the wearable device 104 and the other communications device. Accordingly, the eNodeB 101 will transmit a paging message, which includes a fallback indication, 504 to the relay device 431 over the Uu interface 421, which is then relayed 505 via the PC5 interface 432 from the relay device 431 to the wearable device 104. Upon receiving the fallback indication, the wearable device 104 detaches from the relay device 431, and sends a paging response message 506 via the Uu interface 421 directly to the eNodeB 101, confirming that it is ready to communicate with the other communications device.

Figure 6:
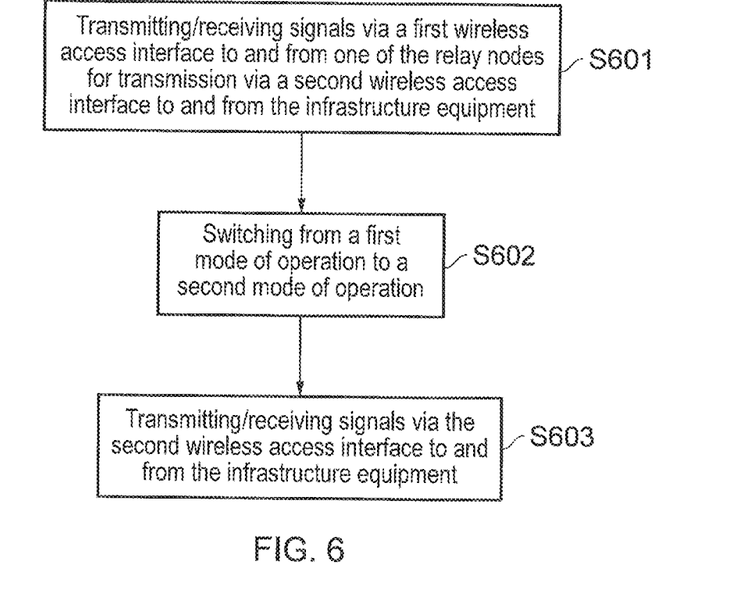
FIG. 6 shows a flow diagram illustrating a process of communications between a UE, an eNodeB and a relay node in accordance with embodiments of the present disclosure.

FIG. 6 shows a flow diagram illustrating a method of controlling communications between a UE, an eNodeB and a relay node in a mobile communications network in accordance with embodiments of the present disclosure. The method comprises, in step S601, in a first mode of operation, performing one or more of transmitting signals representing data via a first wireless access interface to the relay node for transmission via a second wireless access interface to the infrastructure equipment, and receiving signals representing data via the second wireless access interface from the infrastructure equipment via the first wireless access interface from the relay node. In step S602, the method comprises switching, in response to predetermined conditions, to a second mode of operation. In in the second mode of operation, in step S603, the process involves performing one or more of transmitting signals representing data via the second wireless access interface to the infrastructure equipment, and receiving signals representing data via the second wireless access interface from the infrastructure equipment.

Advantages of embodiments of the present technique include that they allow for a communications device to save power by communicating across a low power, narrowband link to a relay device which is in close proximity to the communications device when in a mode which requires little or no communication with the network, but allows for the quick setup of a call with the cellular network when necessary.

The following numbered paragraphs provide further example aspects and features of the present technique:

Paragraph 1. A communications device configured to communicate with an infrastructure equipment forming part of a mobile communications network, and to communicate with one or more relay nodes of the mobile communications network, wherein the communications device comprises a receiver configured to receive signals on the downlink from the one or more relay nodes via a first wireless interface, and to receive signals on the downlink from the infrastructure equipment via a second wireless access interface, a transmitter configured to transmit signals on the uplink to the one or more relay nodes via the first wireless access interface, and to transmit signals on the uplink to the infrastructure equipment via the second wireless access interface, and a controller configured to control the receiver to receive the signals and to control the transmitter to transmit the signals, wherein the controller is configured in combination with the receiver and the transmitter in a first mode of operation to perform one or more of transmitting signals representing data via the first wireless access interface to one of the relay nodes for transmission via the second wireless access interface to the infrastructure equipment, and receiving signals representing data via the second wireless access interface from the infrastructure equipment via the first wireless access interface from the one of the relay nodes, and in response to predetermined conditions to switch to a second mode of operation, in the second mode of operation performing one or more of transmitting signals representing data via the second wireless access interface to the infrastructure equipment, and receiving signals representing data via the second wireless access interface from the infrastructure equipment.

Paragraph 2. A communications device according to Paragraph 1, wherein the predetermined conditions comprise the reception of a fallback indication, the fallback indication indicating to the communications device should switch to the second mode of operation.

Paragraph 3. A communications device according to Paragraph 2, wherein the communications device is configured to receive from the infrastructure equipment via the one of the relay nodes a paging message, the paging message including the fallback indication, and to transmit to the infrastructure equipment a paging response message, the paging response message indicating that the communications device has received the paging message including the fallback indication.

Paragraph 4. A communications device according to any of Paragraphs 1 to 3, wherein the predetermined conditions comprise an initiation of a service having a Quality of Service, QoS, requirement of greater than a predetermined threshold.

Paragraph 5. A communications device according to Paragraph 4, wherein the predetermined conditions comprise an initiation of a voice call via the infrastructure equipment.

Paragraph 6. A communications device according to any of Paragraphs 1 to 3, wherein the predetermined conditions comprise an initiation of a service with a throughput of signals representing data being higher than a predetermined threshold.

Paragraph 7. A communications device according to any of Paragraphs 1 to 3, wherein the predetermined conditions comprise an initiation of a service with a latency of signals representing data being lower than a predetermined threshold.

Paragraph 8. A communications device according to any of Paragraphs 1 to 3, wherein the predetermined conditions comprise an initiation of a service with a reliability requirement of signals representing data being higher than a predetermined threshold.

Paragraph 9. A communications device according to any of Paragraphs 1 to 3, wherein the predetermined conditions comprise the reception of an indication that system information has been updated on the second wireless access interface.

Paragraph 10. A communications device according to Paragraph 9, wherein upon completion of acquisition of the updated system information on the second wireless access interface, the communications device is configured to switch to the first mode of operation.

Paragraph 11. A communications device according to any of Paragraphs 1 to 10, wherein the second wireless access interface has a relative capability higher than a relative capability of the first wireless access interface.

Paragraph 12. A communications device according to any of Paragraphs 1 to 11, wherein the communications device and the one or more relay nodes each have a unique Universal Integrated Circuit Card, UICC, identity.

Paragraph 13. A communications device according to any of Paragraphs 1 to 12, wherein the communications device and the one or more relay nodes each have a unique Subscriber Identity Module, SIM, identity.

Paragraph 14. An infrastructure equipment forming part of a mobile communications network configured to communicate with a communications device, and to communicate with one or more relay nodes of the mobile communications network, wherein the infrastructure equipment comprises a receiver configured to receive signals on the uplink from the one or more relay nodes via a second wireless access interface of the mobile communications network, and to receive signals on the uplink from the communications device via the second wireless access interface, a transmitter configured to transmit signals on the downlink to the one or more relay nodes via the second wireless access interface, and to transmit signals on the downlink to the communications device via the second wireless access interface, and a controller configured to control the receiver to receive the signals and to control the transmitter to transmit the signals, wherein the controller is configured in combination with the receiver and the transmitter in a first mode of operation to perform one or more of transmitting signals representing data via the second wireless access interface to one of the relay nodes for transmission via a first wireless access interface to the communications device, and receiving signals representing data via the first wireless access interface from the communications device via the second wireless access interface from the one of the relay nodes, and in response to predetermined conditions to switch to a second mode of operation, in the second mode of operation performing one or more of transmitting signals representing data via the second wireless access interface to the communications device, and receiving signals representing data via the second wireless access interface from the communications device.

Paragraph 15. An infrastructure equipment according to Paragraph 14, wherein the predetermined conditions comprise the transmission of a fallback indication, the fallback indication indicating to the communications device that it should switch to the second mode of operation.

Paragraph 16. An infrastructure equipment according to Paragraph 15, wherein the infrastructure equipment is configured to transmit to the communications device via the one of the relay nodes a paging message, the paging message including the fallback indication, and to receive from the communications device a paging response message, the paging response message indicating that the communications device has received the paging message including the fallback indication.

Paragraph 17. An infrastructure equipment according to Paragraph 16, wherein the paging message including the fallback indication is transmitted to the communications device via the one of the relay nodes in response to receiving from a second communications device signals representing data to be transmitted to the first communications device, wherein the connection between the first communications device and the one of the relay nodes is a non-optimal physical channel.

Paragraph 18. An infrastructure equipment according to Paragraph 17, wherein a required transmission power of the signals representing the data is higher than a transmission power supported by the connection between the first communications device and the one of the relay nodes.

Paragraph 19. An infrastructure equipment according to Paragraph 17, wherein a complexity of the signals representing the data is higher than a complexity of signals that are supported by the connection between the first communications device and the one of the relay nodes.

Paragraph 20. A method of controlling communications in a mobile communications network, the mobile communications network comprising one or more communications devices, one or more relay nodes and an infrastructure equipment, the method comprising in a first mode of operation, performing one or more of transmitting signals representing data via a first wireless access interface to one of the relay nodes for transmission via a second wireless access interface to the infrastructure equipment, and receiving signals representing data via the second wireless access interface from the infrastructure equipment via the first wireless access interface from the one of the relay nodes, switching, in response to predetermined conditions, to a second mode of operation, wherein in the second mode of operation, performing one or more of transmitting signals representing data via the second wireless access interface to the infrastructure equipment, and receiving signals representing data via the second wireless access interface from the infrastructure equipment.

Paragraph 21. Circuitry for a communications device configured to communicate with an infrastructure equipment forming part of a mobile communications network, and to communicate with one or more relay nodes of the mobile communications network, wherein the communications device comprises a receiver configured to receive signals on the downlink from the one or more relay nodes via a first wireless interface, and to receive signals on the downlink from the infrastructure equipment via a second wireless access interface, a transmitter configured to transmit signals on the uplink to the one or more relay nodes via the first wireless access interface, and to transmit signals on the uplink to the infrastructure equipment via the second wireless access interface, and a controller configured to control the receiver to receive the signals and to control the transmitter to transmit the signals, wherein the controller is configured in combination with the receiver and the transmitter in a first mode of operation to perform one or more of transmitting signals representing data via the first wireless access interface to one of the relay nodes for transmission via the second wireless access interface to the infrastructure equipment, and receiving signals representing data via the second wireless access interface from the infrastructure equipment via the first wireless access interface from the one of the relay nodes, and in response to predetermined conditions to switch to a second mode of operation, in the second mode of operation performing one or more of transmitting signals representing data via the second wireless access interface to the infrastructure equipment, and receiving signals representing data via the second wireless access interface from the infrastructure equipment.

Paragraph 22. Circuitry for an infrastructure equipment forming part of a mobile communications network configured to communicate with a communications device, and to communicate with one or more relay nodes of the mobile communications network, wherein the infrastructure equipment comprises a receiver configured to receive signals on the uplink from the one or more relay nodes via a second wireless access interface of the mobile communications network, and to receive signals on the uplink from the communications device via the second wireless access interface, a transmitter configured to transmit signals on the downlink to the one or more relay nodes via the second wireless access interface, and to transmit signals on the downlink to the communications device via the second wireless access interface, and a controller configured to control the receiver to receive the signals and to control the transmitter to transmit the signals, wherein the controller is configured in combination with the receiver and the transmitter in a first mode of operation to perform one or more of transmitting signals representing data via the second wireless access interface to one of the relay nodes for transmission via a first wireless access interface to the communications device, and receiving signals representing data via the first wireless access interface from the communications device via the second wireless access interface from the one of the relay nodes, and in response to predetermined conditions to switch to a second mode of operation, in the second mode of operation performing one or more of transmitting signals representing data via the second wireless access interface to the communications device, and receiving signals representing data via the second wireless access interface from the communications device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.

The invention claimed is:

1. A method of controlling communications in a mobile communications network, the mobile communications network comprising one or more communications devices, one or more relay nodes and an infrastructure equipment, the method comprising
in a first mode of operation, performing one or more of
transmitting signals representing data via a first wireless access interface to one of the relay nodes for transmission via a second wireless access interface to the infrastructure equipment, and receiving signals representing data via the second wireless access interface from the infrastructure equipment via the first wireless access interface from the one of the relay nodes,
switching, in response to predetermined conditions, to a second mode of operation, wherein in the second mode of operation, performing one or more of
transmitting signals representing data via the second wireless access interface to the infrastructure equipment, and receiving signals representing data via the second wireless access interface from the infrastructure equipment,
wherein the predetermined conditions comprise an initiation of a service having a Quality of Service, QoS, requirement of greater than a predetermined threshold, and
wherein the method further comprises:
receiving from the infrastructure equipment via the one of the relay nodes a paging message, the paging message including a fallback indication, and
transmitting to the infrastructure equipment a paging response message, the paging response message indicating that the communications device has received the paging message including the fallback indication.

2. The method as claimed in claim 1, wherein the predetermined conditions comprise an initiation of a voice call via the infrastructure equipment.

3. The method as claimed in claim 1, wherein the predetermined conditions comprise an initiation of a service with a throughput of signals representing data being higher than a predetermined threshold.

4. The method as claimed in claim 1, wherein the predetermined conditions comprise an initiation of a service with a latency of signals representing data being lower than a predetermined threshold.

5. The method as claimed in claim 1, wherein the predetermined conditions comprise an initiation of a service with a reliability requirement of signals representing data being higher than a predetermined threshold.

6. The method as claimed in claim 1, wherein the second wireless access interface has a relative capability higher than a relative capability of the first wireless access interface.

7. The method as claimed in claim 1, wherein the communications device and the one or more relay nodes each have a unique Universal Integrated Circuit Card, UICC, identity.

8. The method as claimed in claim 1, wherein the communications device and the one or more relay nodes each have a unique Subscriber Identity Module, SIM, identity.

9. A method of controlling communications in a mobile communications network, the mobile communications network comprising one or more communications devices, one or more relay nodes and an infrastructure equipment, the method comprising
in a first mode of operation, performing one or more of
transmitting signals representing data via a first wireless access interface to one of the relay nodes for transmission via a second wireless access interface to the infrastructure equipment, and receiving signals representing data via the second wireless access interface from the infrastructure equipment via the first wireless access interface from the one of the relay nodes,
switching, in response to predetermined conditions, to a second mode of operation, wherein in the second mode of operation, performing one or more of
transmitting signals representing data via the second wireless access interface to the infrastructure equipment, and receiving signals representing data via the second wireless access interface from the infrastructure equipment,
wherein the predetermined conditions comprise an initiation of a service having a Quality of Service, QoS, requirement of greater than a predetermined threshold,
wherein the predetermined conditions comprise an indication that system information has been updated on the second wireless access interface, and
wherein upon completion of acquisition of the updated system information on the second wireless access interface, the method further comprising switching to the first mode of operation.

10. Circuitry for a communications device configured to communicate with an infrastructure equipment forming part of a mobile communications network, and to communicate with one or more relay nodes of the mobile communications network, wherein the communications device comprises
a receiver configured to receive signals on the downlink from the one or more relay nodes via a
first wireless interface, and to receive signals on the downlink from the infrastructure equipment via a second wireless access interface,
a transmitter configured to transmit signals on the uplink to the one or more relay nodes via the first wireless access interface, and to transmit signals on the uplink to the infrastructure equipment via the second wireless access interface, and
a controller configured to control the receiver to receive the signals and to control the transmitter to transmit the signals, wherein the controller is configured in combination with the receiver and the transmitter in a first mode of operation to perform one or more of
transmitting signals representing data via the first wireless access interface to one of the relay nodes for transmission via the second wireless access interface to the infrastructure equipment, and receiving signals representing data via the second wireless access interface from the infrastructure equipment via the first wireless access interface from the one of the relay nodes, and in response to predetermined conditions to switch to a second mode of operation, in the second mode of operation performing one or more of transmitting signals representing data via the second wireless access interface to the infrastructure equipment, and receiving signals representing data via the second wireless access interface from the infrastructure equipment, wherein the predetermined conditions comprise an initiation of a service having a Quality of Service, QoS, requirement of greater than a predetermined threshold, and wherein the controller is configured in combination with the receiver and the transmitter is further configured:

to receive from the infrastructure equipment via the one of the relay nodes a paging message, the paging message including a fallback indication, and to transmit to the infrastructure equipment a paging response message, the paging response message indicating that the communications device has received the paging message including the fallback indication.

11. Circuitry for the communications device as claimed in claim 10, wherein the predetermined conditions comprise an initiation of a voice call via the infrastructure equipment.

12. Circuitry for the communications device as claimed in claim 10, wherein the predetermined conditions comprise an initiation of a service with a throughput of signals representing data being higher than a predetermined threshold.

13. Circuitry for the communications device as claimed in claim 10, wherein the predetermined conditions comprise an initiation of a service with a latency of signals representing data being lower than a predetermined threshold.

14. Circuitry for the communications device as claimed in claim 10, wherein the predetermined conditions comprise an initiation of a service with a reliability requirement of signals representing data being higher than a predetermined threshold.

15. Circuitry for the communications device as claimed in claim 10, wherein the second wireless access interface has a relative capability higher than a relative capability of the first wireless access interface.

16. Circuitry for the communications device as claimed in claim 10, wherein the communications device and the one or more relay nodes each have a unique Universal Integrated Circuit Card, UICC, identity.

17. Circuitry for a communications device configured to communicate with an infrastructure equipment forming part of a mobile communications network, and to communicate with one or more relay nodes of the mobile communications network, wherein the communications device comprises:

a receiver configured to receive signals on the downlink from the one or more relay nodes via a first wireless interface, and to receive signals on the downlink from the infrastructure equipment via a second wireless access interface, a transmitter configured to transmit signals on the uplink to the one or more relay nodes via the first wireless access interface, and to transmit signals on the uplink to the infrastructure equipment via the second wireless access interface, and a controller configured to control the receiver to receive the signals and to control the transmitter to transmit the signals, wherein the controller is configured in combination with the receiver and the transmitter in a first mode of operation to perform one or more of transmitting signals representing data via the first wireless access interface to one of the relay nodes for transmission via the second wireless access interface to the infrastructure equipment, and receiving signals representing data via the second wireless access interface from the infrastructure equipment via the first wireless access interface from the one of the relay nodes, and in response to predetermined conditions to switch to a second mode of operation, in the second mode of operation performing one or more of transmitting signals representing data via the second wireless access interface to the infrastructure equipment, and receiving signals representing data via the second wireless access interface from the infrastructure equipment, wherein the predetermined conditions comprise an initiation of a service having a Quality of Service, QoS, requirement of greater than a predetermined threshold, wherein the predetermined conditions comprise an indication that system information has been updated on the second wireless access interface, and wherein upon completion of acquisition of the updated system information on the second wireless access interface, the communications device is configured to switch to the first mode of operation.

* * * * *